Figure 1:
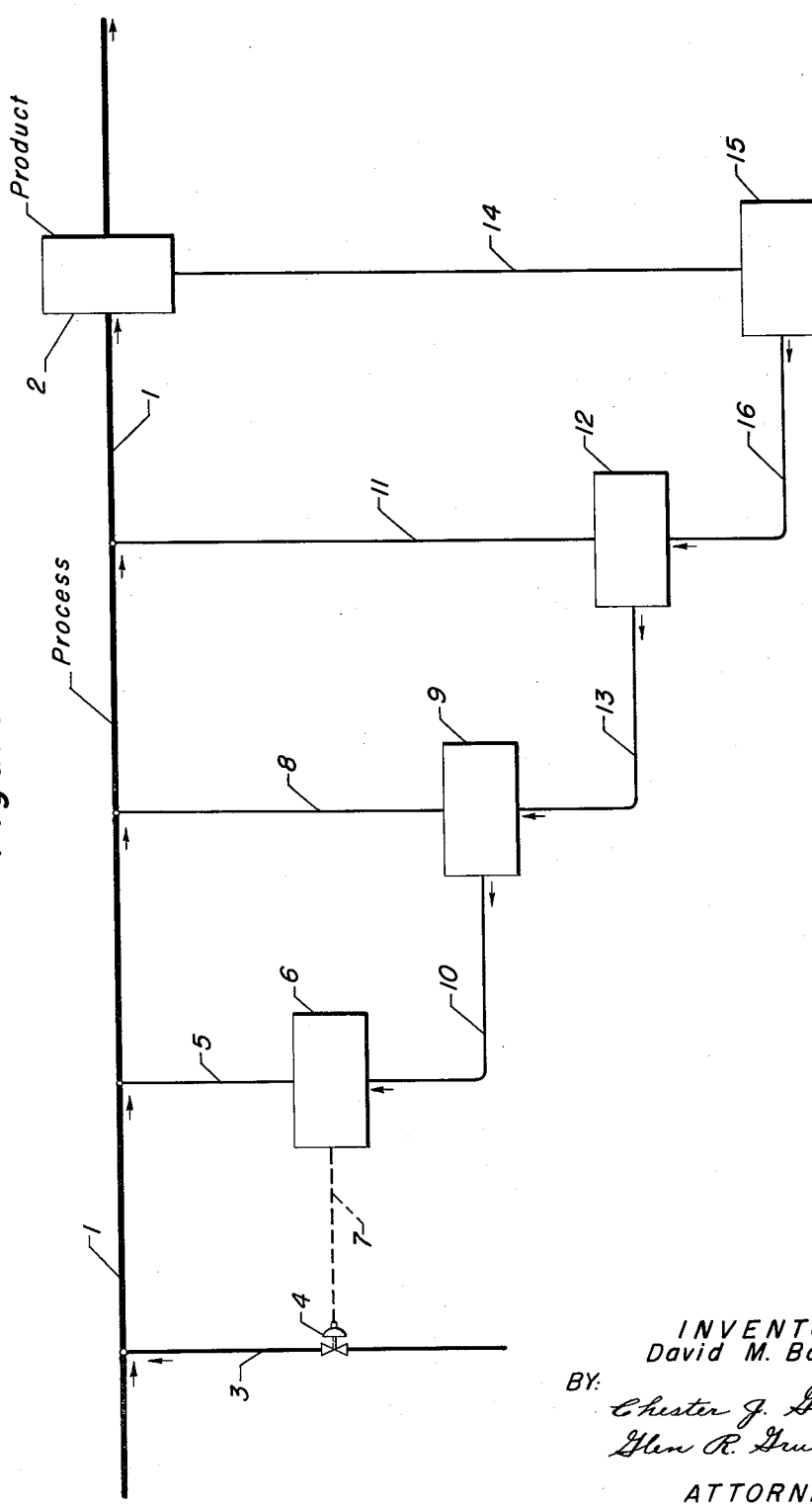

Sept. 19, 1961 D. M. BOYD, JR 3,000,812
METHOD FOR CONTROLLING A PROCESS SUCH AS THE
REFORMING OF LOW OCTANE NAPHTHAS
Filed Dec. 20, 1956 2 Sheets-Sheet 1

INVENTOR:
David M. Boyd Jr.

BY:
Chester J. Giuliani
Glen R. Grunewald

ATTORNEYS:

3,000,812
METHOD FOR CONTROLLING A PROCESS SUCH AS THE REFORMING OF LOW OCTANE NAPHTHAS
David M. Boyd, Jr., Clarendon Hills, Ill., assignor, by mesne assignments, to Universal Oil Products Company, Des Plaines, Ill., a corporation of Delaware
Filed Dec. 20, 1956, Ser. No. 629,731
6 Claims. (Cl. 208—138)

This invention relates to a method for controlling a process and particularly to a method for controlling a process responsive to slow time factor variables.

There are many processes in use wherein a raw material is subjected to a series or sequence of treatments for effecting beneficial changes in it to produce a useful product. This invention treats generally with all such processes but particularly it treats with more complex processes wherein time is consumed between the initial stages of the process and the later stages.

In almost all processes, automatic control is desirable to reduce manpower and avoid human error. Where the characteristic of the product to be produced may be quickly measured and easily adjusted, automatic control is very simple. For example, in the process of heating a home, increased temperature is the product that is sought from the process and it can be quickly and directly measured with a thermometer and quickly fed back to the heat producing source to regulate the amount produced. Therefore, in home heating, the characteristic of the product that is sought is directly measured and fed back with a small time lag or time factor and in processes such as this, the method of this invention is not necessary.

In many processes, however, a long time factor or time lag is experienced between the initial stages of the process and a point in it where the characteristics of the product which are sought can be measured directly. In these processes, the method of this invention is very important.

Examples of the latter processes are usually complex industrial processes such as reforming gasoline wherein the characteristics of the product from the process vary with the temperature of the treatment and, therefore, the temperature of the treatment is the condition which controls the process. The difficulty is that the product quality sought is not temperature but octane number. The process cannot be controlled by sensing the octane number of the product and feeding back directly to the temperature regulator because a change in temperature will not produce a characteristic change in octane number in the final product until several hours have elapsed due to the high inventory of gasoline in the process and the large number of sequential steps required to produce the ultimate product.

As another example, in the manufacture of refractory or inert materials such as alumina or silica which are useful as catalyst supports, adsorbents, refractories, etc., the pH of the solution from which the refractories are formed is measured as a variable to be controlled to determine the ultimate characteristic of the product, however, pH is not the quality sought in the product but other qualities such as porosity, hardness, adsorptivity, etc., are. In this process one cannot measure the hardness of the ultimate product and feed back such a measurement to a controlling device to regulate the composition of the forming solution since a period of hours and sometimes even days elapses between the formation of the starting solution and the realization of the ultimate product which is made from that solution.

As other examples, in the steel industry the color of the molten steel or the temperature of the molten steel is measured to determine its ultimate characteristics, however, color or temperature are not the characteristics which are sought but rather yield point or elastic limit and in the manufacture of beverages such as beer the temperature at which fermentation is effected is measured but the product sought is clarity or taste of the final beverage.

The foregoing illustrate that the method of this invention is useful in any process wherein a sequence of steps is required to produce an ultimate product, however, for purposes of brevity and simplicity and since the petroleum industry is such a good example, the method of this invention will be described in relation to a specific petroleum process.

In reforming gasolines, a straight run or other gasoline fraction which may have an octane number of between 30 and 60 is contacted, in the presence of hydrogen, with a platinum-alumina catalyst at temperatures between 800° F. and 1000° F. and pressures between 200 to 1000 p.s.i. From this there results a product having an octane number of between 85 and 100 and having improved stability, purity with regard to sulfur and nitrogen, and generally improved characteristics as a fuel. The improvement effected in the gasoline results from a number of reactions which include dehydrogenation of naphthenes to produce aromatics, cyclization of straight-chain hydrocarbons to produce cyclic hydrocarbons, hydrocracking of larger molecules to produce smaller molecules, isomerization of straight-chain molecules to produce branched-chain molecules and others. In effecting this process, the charge stock is passed sequentially through at least a furnace, a series of reaction zones, a liquid gas separator in which an inventory of liquid is maintained, and at least one fractional distillation column wherein another inventory of liquid is maintained.

Although, as hereinbefore stated, the ultimate characteristic of the product sought from the process is improved octane rating of the gasoline, the process is controlled by the temperature of the initial furnace effluent. The condition which is measured to control the process bears no direct relationship to the octane number of the product but only to the temperature of the effluent from the heater. In other words, since higher temperatures produce greater conversion and hence higher octane numbers of the product, the temperature of the effluent from the initial heating zone is controlled to regulate the output from the process and, if it is found that the octane rating characteristics of the product do not conform to those sought, the temperature at which the furnace effluent is controlled is changed, for example, by adjusting the set point of a temperature controlling instrument. It is obvious that this is not the perfect way to control the process since the object of the process is not to obtain temperature in the furnace effluent but to obtain octane rating in the final product and, therefore, it is controlled by something not related to what is sought. This difficulty is manifested in several ways. One is that the thermocouple or equivalent device which senses the temperature may not be accurate and, therefore, the process control is dependent upon the accuracy of a measuring device which bears little relation to the product. Even accurate thermocouples tend to drift as they get old or as the temperature changes and, therefore, continuous adjustment of the process to compensate for measuring errors must be made. Also, the composition of the charge might change so that even accurate thermocouples will yield an off-specification product or the activity of the catalyst may diminish so that a previously satisfactory processing temperature becomes too low.

Attempts have been made to employ a continuous knock engine, which determines the octane rating of the final product, in conjunction with a suitable control instrument to feed back an impulse that will regulate a processing condition. For example, variations from the set point on the octane rating of the product from a reformer may be fed back directly to a valve controlling the fuel consumption rate in the furnace and, therefore, change the temperature of processing responsive to variations in the octane rating of the product. When this system is employed the time lag between a change in the temperature of the furnace effluent and a representative change in the octane number of the product will be at least several hours. Besides requiring at least 20 minutes for the charge to flow entirely through the process, at least two dilutions of liquid pools must be effected as well as the dilution of the vaporous inventory in the plant. Control with such a long time lag is so difficult that it is virtually unused.

There have been many compromise control means employed which do not measure directly the characteristic which is sought of the product but do measure characteristics of intermediate material which indicate what the characteristics of the product are. For example, in a reforming process, the various hereinbefore described reactions effected result in a net endothermic reaction which is manifested by a temperature drop across the reaction zone. The amount of temperature drop through the reactor is an indication of the extent of the reactions and, therefore, an indication of the composition of the product and this measurement, i.e., temperature drop across the reactor is sometimes used in conjunction with a controlling instrument to regulate a process condition such as the temperature of the furnace effluent.

Another condition which can be measured as an indication of the ultimate product composition is the ratio of hydrogen made by dehydrogenation of naphthenes to normally gaseous hydrocarbons made by hydrocracking and this ratio is obtained by measuring the flow rate of gas from the reactor effluent receiver and comparing it with the flow rate of gas from the fractionation zone. Similar to the temperature differential measurement, this ratio may be used as an indication of the composition of the product but it too does not measure directly the quality sought. Other compromise characteristics are the optical qualities of the product from some point in the process, its density, its color, etc. It may be noticed that all of these compromise characteristics require a longer time factor than the furnace effluent temperature measurement but a shorter time factor than a direct octane number measurement. It is an object of this invention to provide a control method with a quick response and a short time factor that is still sensitive to the characteristic which is sought in the product from the process.

It is an embodiment of this invention to provide a method for controlling a process which comprises sensing the magnitude of a fast time response condition which is indicative of the extent of said process, transmitting said sensation to a first controlling means which changes a significant processing condition responsive to variations in said fast time response condition, sensing the magnitude of a slower time response condition which is more indicative of the quality sought in the product of the process, transmitting the latter sensation to a second controlling means and regulating the set point of said first controlling means responsive to variations in said latter condition.

As hereinbefore stated, the object of this invention is to provide a quick time response control for a process but to still make the process control sensitive to the product characteristic which is sought. These two limitations on a method of controlling a process were heretofore thought inconsistent, that is, if one is present, the other is necessarily lacking. This invention provides such a system by controlling a fast response but indirect means for establishing a level or magnitude of a significant processing condition with a slow response means which is responsive to a direct measurement of the characteristic sought in the product. In other words, relating again to the example of a reforming operation, a direct measurement of octane number operating through a suitable control instrument will adjust the set point on a temperature control which is regulating the temperature of the furnace effluent so that the temperature at which the furnace effluent is controlled is thereby directly related to the octane number of the product which is the thing actually sought.

The method of this invention may be better explained with reference to the accompanying drawings which illustrate in FIGURE 1 a schematic of a general process and its method of regulation and in FIGURE 2 the specific application of this invention to the process for reforming gasoline. It is to be understood that the explanation with relation to FIGURES 1 and 2 is intended to be illustrative rather than limiting upon the scope of this invention.

In FIGURE 1, line 1 is a schematic representation of a process in which a raw material is converted by a sequence of steps, illustrated by distance along line 1, resulting in a product collected in receiver 2. Line 3 contains a means for varying a condition at which a portion of the process is effected and it contains a valve or other means 4 which controls the extent to which this condition-varying means is employed.

In the process herein illustrated, line 5 carries a sensation of a process condition to controller 6 which acts responsive to said condition through line 7 on valve 4 thereby maintaining the condition at the set point at which controller 6 is set. Of course, in order for this to be effected the condition-changing means in line 3 must act to affect the condition which controller 6 is sensing. Line 8 at a later stage of the process senses another process condition which has a longer time factor, that is, has a longer time lag before it is capable of being sensed, but which is more indicative of the ultimate characteristics of the product. The sensations are transmitted to controller 9 and controller 9 attempts to maintain the conditions sensed at a set point by acting through means 10 upon controller 6 to change its set point so that the condition it seeks to establish is established at a level more consistent with producing the desired product. Similarly, line 11 carries a sensation of still a different condition which has a longer time factor but is still more indicative of the desired product characteristics to controller 12 which in turn acts through means 13 to reset the set point of the hereinbefore described controller 9. Any number of intermediate controllers may be employed and more will be necessary when the time lag between the initial stages of the process and recovery of the ultimate product is longer. Ultimately, however, the final product is obtained as in receiver 2 and the characteristic which is sought in the product is sensed and transmitted via line 14 to controller 15 which acts through means 16 upon the next previous controller in the sequence. It is to be understood, of course, that in simple processes, controller 15 may act directly upon controller 6 and in more complex processes, additional controllers may be inserted between controller 15 and controller 12, however, each subsequent control must measure a quality which is equally indicative or more indicative of the ultimate product characteristics but which is measured a longer time from the initial stages of the process.

Figure 2:
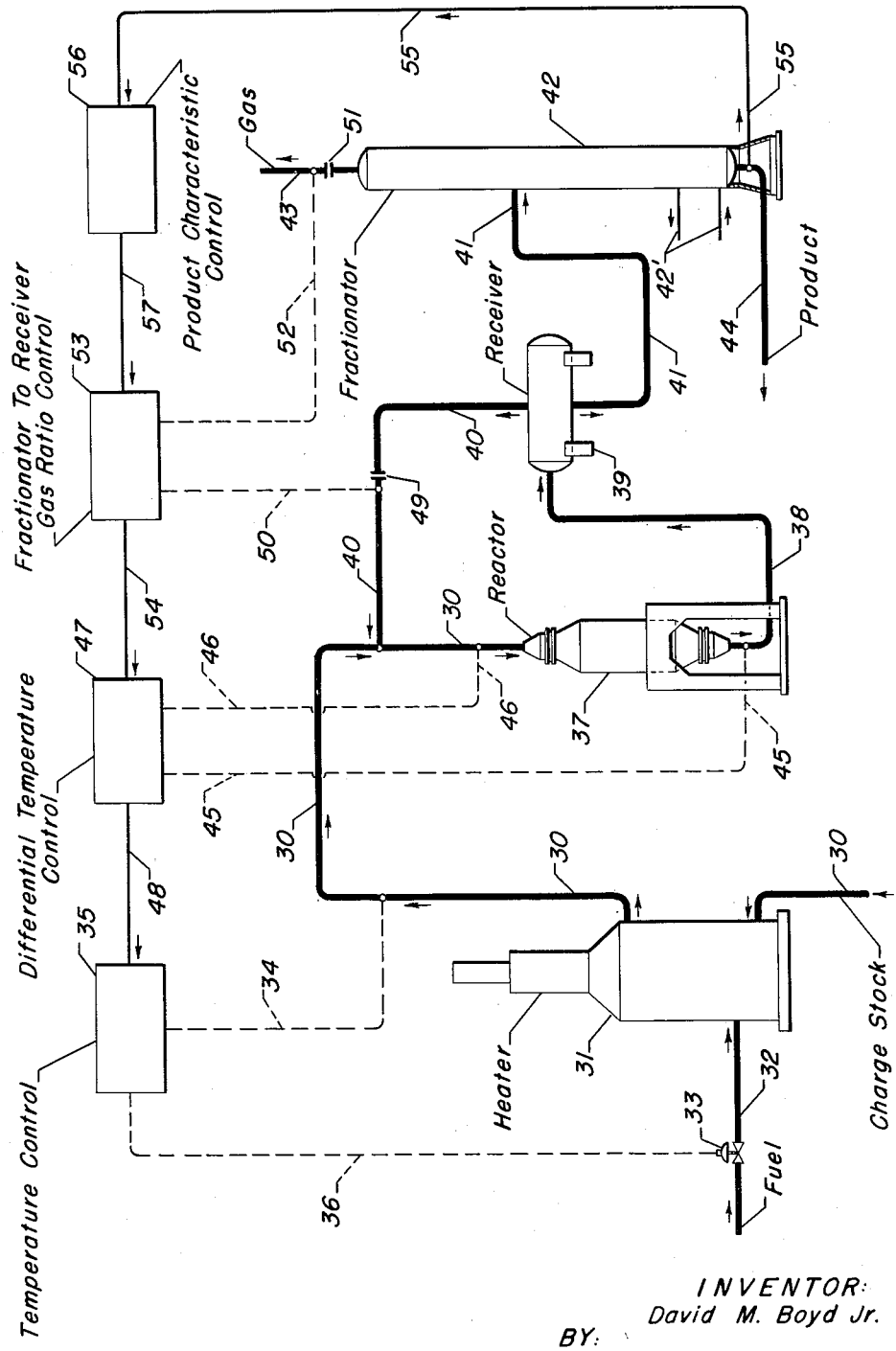

As heretofore stated, FIGURE 2 illustrates a specific example of the process of this invention, applying it to the process of reforming gasoline. In FIGURE 2, charge stock which may be any gasoline fraction requiring reforming enters the process through line 30, passes through heater 31, is mixed with hydrogen through line 40 and ultimately enters reactor 37. The extent of conversion in reactor 37 depends upon many things including the temperature of the reactants which is sensed through means 34, such as a thermocouple and controlled via controller 35 and line 36 by regulating the amount of fuel consumed in heater 31 entering through line 32 and valve 33. Present practice uses only this control with small modifications for regulating a process such as this.

In reactor 37, the hereinbefore described reactions are effected and there results a net temperature drop which may be sensed in differential temperature controller 47 via temperature sensing means 45 and 46 downstream and upstream respectively of reactor 37. The effluent from reactor 37 which is a mixture of hydrogen gas, normally gaseous hydrocarbons and liquid hydrocarbons boiling mostly in the gasoline range passes to receiver 39 wherein it is cooled and separated into a vapor phase and a liquid phase at a temperature and pressure adapted so that the vapor phase is substantially hydrogen. This vapor passes through line 40 and is returned at least in part to line 30 to be used again as a reactant in the reactor. Most reforming processes produce a net yield of hydrogen which is vented by means not here shown. The liquid from the receiver is passed through line 41 into an intermediate portion of fractionator 42 wherein the normally gaseous hydrocarbons are separated from the gasoline fraction which is the desired product from the process. This fractionation is usually referred to as stabilizing and consists of removing a very small amount of undesirable gas overhead and taking a large amount of gasoline product as bottoms. A heater 42' may be disposed in the bottom of fractionator 42 to provide a stripping gas stream and suitable absorbing liquid or reflux to the top of fractionator 42 may be provided when necessary. The gaseous product discharges through line 43 and the liquid product is withdrawn through line 44 to storage.

As heretofore stated, the ratio of hydrogen produced to normally gaseous hydrocarbon produced is an indication of the extent to which dehydrogenation and hydrocracking are effected. By placing a flow measuring device 49 in line 40 and transmitting the flow rate through this line to fractionator to receiver gas ratio control 53 and similarly via flow rate measuring means 51 and line 52 obtaining and transmitting the flow rate of normally gaseous hydrocarbons passing through line 43 to controller 53, this ratio may be obtained and employed to control the process as will be hereinafter described.

The measurement which will effect ultimate control over the process is product characteristic controller 56 which samples the final product through line 55 and measures its octane rating and makes changes in the process responsive to variations in this octane rating.

As heretofore stated, the temperature in line 30 is sensed and transmitted to a temperature controller 35 which acts upon a valve 33 to make changes in the fuel burning rate responsive to variations in line 30. This control has a very fast time response, i.e., a change in the fuel burning rate will produce a characteristic change in the temperature in line 30 very quickly and therefore the control is very effective for maintaining the temperature at the desired level. Due to inaccurate thermocouples, a change in charge stock composition, a change in catalyst activity, a drift in the instrument setting or any number of other reasons, the temperature of the material in line 30 may not be the temperature required to produce a product having the desired characteristics. To improve the control system, therefore, this process employs a differential temperature control which measures the temperature drop across the reaction zone thereby indicating the amount of reaction effected in the reaction zone. Variations from the set point on differential temperature controller 47 will cause controlling means 48 to act upon the set point of temperature controller 35 so that it is changed in a direction to restore the temperature drop across reactor 37 to what it should be, or in other words, to the set point of temperature controller 47. It may, therefore, be seen that even though temperature controller 35 is functioning perfectly to maintain the temperature of the material in line 30 at the set point, differential temperature controller 47 will be able to sense when the set point of temperature controller 35 is at the wrong position and will furthermore act upon it to change it to the right position.

In some instances, for example, when the charge stock composition varies so that it contains greater quantities of large paraffinic molecules, the temperature drop across the reactor will be less because a lesser proportion of naphthene dehydrogenation is being effected, the latter being an endothermic reaction and a greater proportion of hydrocracking will be effected, the latter being a neutral or slightly exothermic reaction, the temperature drop across the reactor may not be as good an indication of the octane number of the final product as is desired. In a case such as this, a lesser temperature drop will be realized because the conversion is of a different quality although of a sufficient extent to realize the octane number which is sought. In this case fractionator to receiver gas ratio controller 53 will indicate that too much hydrocracking is being effected in order for there to be sufficient temperature drop across reactor 37 to satisfy differential temperature controller 47. When differential temperature controller 47 requires high temperatures in line 30 in order for sufficient temperature drop across the reactor, extensive hydrocracking will be effected and this condition will manifest itself in a large production of gas passing overhead from fractionator 42 through line 43. The disturbed ratio of fractionator gas to receiver gas indicated to controller 53 will act through means 54 to re-establish the set point in differential temperature controller 47 so that it does not require such a great temperature drop through the reactor and it in turn will act upon temperature controller 35 so that it does not maintain such a high temperature in line 30.

As heretofore stated, the ultimate control of the process resides in the controller which senses the quality which is sought in the product from the process. Line 55 samples the product and through known analytical means determines its octane rating. This octane rating will vary depending upon the extent of various reactions effected. When, for example, the catalyst activity diminishes so that the dehydrogenation of naphthenes is not effected to as great an extend as it was in the initial stages of the processing, the desired octane number must be realized by increased hydrocracking so that the extent of hydrocracking is increased as the extent of dehydrogenation is increased in order to maintain a given octane rating of the product. When this happens, the controller 53 will indicate that too high a fractionator to receiver gas ratio exists, however, the ultimate analyzer of the product acting through controller 56 will act through means 57 to reset the set point of controller 53 so that greater quantities of fractionator gas compared with receiver gas will be allowed. Of course, the changed set point in controller 53 will cause a changed set point in controller 47 which in turn will cause a changed set point in controller 35 which will regulate the temperature of the furnace effluent in line 30.

Therefore, the operation of this process in accordance with the method of this invention provides for a very rapid response control of a process, i.e., temperature control of the effluent of a furnace, which is ultimately related to the quality of the product which the process seeks to produce, i.e., the octane number of the product, even though a period of hours or even days may elapse between the time a condition is changed by the first controller and the time that the result of the change of that condition eventually affects the ultimate product.

The example of FIGURE 2 has been complicated for purposes of illustration and includes at least one extra controller, however, it serves to illustrate that controllers in series may be used, one controller to improve the operation of the next, so that the desired result which is a fast response control system that is sensitive to the ultimate product characteristics, is obtained.

As heretofore stated, the method of this invention is intended as a general one which is applicable to many industries, many purposes, and many generic types of controls. The controllers such as controllers 35, 47, 53 and 56 in FIGURE 2 may be any of those controllers which are commercially available and which perform the function of responding to a stream property sensation to act upon another device responsive to variations in that stream property. They may be hydraulic, pneumatic, electronic, or mechanical in nature and may act upon a valve, a potentiometer, a shaft, etc. to effect a change in the stream property. It is also within the scope of this invention to have a central control point which is in the nature of a digital or analog computer so that sensations from all of the stream property-sensing points of the process may be accumulated at a central position and the magnitude of one may be adjusted by sensations from any other. It is also within the scope of this invention to sense stream properties other than those described such as pressure, velocity, differential pressure, direction, horizontalness, elevation, humidity, brightness, color, or any other. As a concept it may be stated that any stream property which may be sensed and measured and which is capable of actuating a controlling device may be employed in the method of this invention.

The foregoing description refers frequently to a "set point" which is a device associated with currently employed instruments which indicates the desired magnitude of a stream property at which the instrument seeks to maintain the stream property it controls. It is to be understood that this invention is not limited to instruments or systems having set points, but any equivalent to a set point is intended whether it be mechanical, electronic, pneumatic, etc.

Reference in the foregoing description has also been made to a "significant condition" and it is herein defined as a stream property which, when changed, will have a significant effect upon the product from the process. For example, in the reforming process described there are many stream properties which may be sensed such as the temperature, the pressure, the linear velocity of fluid flowing through a pipe, the ratio of hydrogen to hydrocarbon in the reaction vessel, etc. Some of these stream properties such as the temperature and the pressure at which the reaction is effected exert an important effect upon the characteristics of the product while others such as the linear velocity of fluid in the pipes or the ratio of hydrogen to hydrocarbon either have small effect or no effect on the ultimate product. Obviously, the only stream properties which this invention contemplates are significant stream properties or those which, when measured, indicate the course that the process is taking and when changed will cause a change in the product characteristics.

It is within the scope of this invention to include maximum and minimum limitations on each of the controllers as safety factors or reasonable limits to a process. For example, in the reforming process which is the subject of FIGURE 2, it is well established that reforming catalysts are destroyed when subjected to too high temperatures and, therefore, the temperature controller 35 will be adjusted so that its set point will never go above the reasonable temperature limits of the process regardless of the action of controller 47 upon it. The reasonable maximum process limits of the other controllers will also be established as well as reasonable minimum limits to prevent damage to equipment and to forestall harmful results of malfunctioning equipment.

It is also within the scope of this invention to impose time delays between consecutive actions of slow time response instruments so that the results of a change effected by them will be reflected in the product before more changes in set points are made.

From the foregoing, it may readily be seen that the method of this invention provides a novel and highly useful method for controlling a process which provides to the control method what was heretofore desirable but inconsistent limitations, namely fast response and sensitivity to the ultimate product characteristics.

I claim as my invention:

1. In a continuous fluid treating process comprising a series of at least three separate fluid processing zones each having at least one fluid input stream and at least one fluid output stream, a fluid output stream of each zone excepting the last of said series comprising an input stream to the next succeeding zone whereby a change in a significant processing condition of a fluid input stream to the first zone of said series is manifested first in a change in a first stream property of a first zone fluid output stream and successively later in a change in a stream property of a fluid output stream of each succeeding zone, the method of controlling a stream property of a fluid output stream of the last zone of said series which comprises producing a reference signal corresponding to the desired magnitude of said last zone fluid output stream property, producing a first control signal responsive both to said reference signal and to the actual magnitude of said last zone fluid output stream property, producing a second control signal responsive both to said first control signal and to the magnitude of a stream property of a fluid output stream from a zone other than said first and last zones, producing a third control signal responsive both to said second control signal and to the magnitude of said first stream property, and varying said significant processing condition in response to said third control signal.

2. In a continuous reforming process wherein a low octane hydrocarbon charge and hydrogen are heated to an elevated reactor inlet temperature and passed in admixture through a reactor containing a fixed bed of reforming catalyst to yield effluent comprising a hydrocarbon product of improved octane number, the overall reforming reaction within said reactor being endothermic whereby a temperature drop occurs through said bed, and wherein at least a portion of said effluent is then fractionated to yield said hydrocarbon product, the method of controlling the octane number of said product which comprises producing a reference signal corresponding to the desired magnitude of said octane number, producing a first control signal responsive both to said first reference signal and to the actual magnitude of said octane number, producing a second control signal responsive both to said first control signal and to the magnitude of said temperature drop, producing a third control signal responsive both to said second control signal and to said reactor inlet temperature, and varying said reactor inlet temperature in response to said third control signal.

3. In a continuous reforming process which comprises the steps of (1) heating reactants comprising a low octane hydrocarbon charge and hydrogen to reforming temperature, (2) passing said reactants in admixture through a fixed bed of reforming catalyst to yield effluent comprising hydrogen, normally gaseous hydrocarbons, and reformate of improved octane number, said reactants undergoing a temperature drop through said bed, (3) separating a net hydrogen-containing stream from said effluent, and (4) fractionating the remaining effluent to yield an overhead stream containing in major proportion said normally gaseous hydrocarbons and a bottom stream containing in major proportion said reformate, the method of controlling the octane number of said reformate which comprises producing a reference signal corresponding to the desired magnitude of said octane number, producing a first control signal responsive both to said reference signal and to the actual magnitude of said octane number, producing a second control signal responsive both to said first control signal and to the ratio of the flow rate of said hydrogen-containing stream to the flow rate of said overhead stream, producing a third control signal responsive both to said second control signal and to the magnitude of said temperature drop, producing a fourth control signal responsive both to said third control signal and to said reforming temperature, and varying said reforming temperature in response to said fourth control signal.

4. In a continuous reforming process wherein a low octane hydrocarbon charge and hydrogen are heated to reforming temperature and passed in admixture into contact with a reforming catalyst to yield effluent comprising hydrogen, normally gaseous hydrocarbons and reformate of improved octane number, and wherein a net hydrogen-containing stream is separated from said effluent and the remaining effluent is fractionated to yield an overhead stream containing in major proportion said normally gaseous hydrocarbons and a bottoms stream containing in major proportion said reformate, the method of controlling the octane number of said reformate which comprises producing a reference signal corresponding to the desired magnitude of said octane number, producing a first control signal responsive both to said reference signal and to the actual magnitude of said octane number, producing a second control signal responsive both to said first control signal and to the ratio of the flow rate of said hydrogen-containing stream to the flow rate of said overhead stream, producing a third control signal responsive both to said second control signal and to the magnitude of said reforming temperature, and varying said reforming temperature in response to said third control signal.

5. In a continuous hydrocarbon conversion process wherein a hydrocarbonaceous charge is passed through a conversion zone at conversion conditions and a product stream is separated from the resulting conversion products, said conversion process comprising a series of at least three separate hydrocarbon processing zones including said conversion zone and each of said zones having at least one hydrocarbon input stream and at least one hydrocarbon output stream, a hydrocarbon output stream of each zone excepting the last of said series comprising an input stream to the next succeeding zone and a hydrocarbon output stream of said last zone constituting said product stream whereby a change in a significant processing condition of a hydrocarbon input stream to the first zone of said series is manifested first in a change in a first stream property of a first zone hydrocarbon output stream and successively later in a change in a stream property of a hydrocarbon output stream of each succeeding zone, the method of controlling a stream property of said product stream which comprises producing a reference signal corresponding to the desired magnitude of said product stream property, producing a first control signal responsive both to said reference signal and to the actual magnitude of said product stream property, producing a second control signal responsive both to said first control signal and to the magnitude of a stream property of a hydrocarbon output stream from a zone other than said first and last zones, producing a third control signal responsive both to said second control signal and to the magnitude of said first stream property, and varying said significant processing condition in response to said third control signal.

6. In a continuous hydrocarbon reforming process wherein a hydrocarbonaceous charge is passed through a reforming zone at reforming conditions and a product stream is separated from the resulting reformed charge, said reforming process comprising a series of at least three separate hydrocarbon processing zones including said reforming zone and each of said zones having at least one hydrocarbon input stream and at least one hydrocarbon output stream, a hydrocarbon output stream of each zone excepting the last of said series comprising an input stream to the next succeeding zone and a hydrocarbon output stream of said last zone constituting said product stream whereby a change in a significant processing condition of a hydrocarbon input stream to the first zone of said series is manifested first in a change in a first stream property of a first zone hydrocarbon output stream and successively later in a change in a stream property of a hydrocarbon output stream of each succeeding zone, the method of controlling a stream property of said product stream which comprises producing a reference signal corresponding to the desired magnitude of said product stream property, producing a first control signal responsive both to said reference signal and to the actual magnitude of said product stream property, producing a second control signal responsive both to said first control signal and to the magnitude of a stream property of a hydrocarbon output stream from a zone other than said first and last zones, producing a third control signal responsive both to said second control signal and to the magnitude of said first stream property, and varying said significant processing condition in response to said third control signal.

References Cited in the file of this patent

UNITED STATES PATENTS

| | | |
|---|---|---|
| 1,940,355 | Knapp | Dec. 19, 1933 |
| 2,373,888 | Hachmuth | Apr. 17, 1945 |
| 2,709,678 | Berger | May 31, 1955 |
| 2,849,379 | Hengstebeck | Aug. 26, 1958 |
| 2,903,417 | Beaugh et al. | Sept. 8, 1959 |